(12) United States Patent
Golding

(10) Patent No.: US 9,016,151 B2
(45) Date of Patent: Apr. 28, 2015

(54) HIGH INTEGRITY LINEAR ACTUATOR AND METHOD OF OPERATION

(75) Inventor: Terence Ross Golding, Tewkesbury (GB)

(73) Assignee: Triumph Actuation Systems—UK, Ltd., Flintshire (GB)

( * ) Notice: Subject to any disclaimer, the term of this patent is extended or adjusted under 35 U.S.C. 154(b) by 181 days.

(21) Appl. No.: 13/475,430

(22) Filed: May 18, 2012

(65) Prior Publication Data

US 2012/0291574 A1 Nov. 22, 2012

(30) Foreign Application Priority Data

May 20, 2011 (GB) .................................. 1108483.7

(51) Int. Cl.
*F16H 3/06* (2006.01)
*F16H 1/20* (2006.01)
*F16H 27/02* (2006.01)
*F16H 29/02* (2006.01)
*F16H 29/20* (2006.01)
*F16H 19/04* (2006.01)
*F16H 25/20* (2006.01)

(52) U.S. Cl.
CPC .............. *F16H 19/04* (2013.01); *F16H 25/205* (2013.01)

(58) Field of Classification Search
CPC ............ F16H 25/20; F16H 2025/2075; F16H 2025/2081; F16H 2025/2031; F16H 19/0663; F16H 25/2252; F16H 25/205; F16H 25/2266; F16H 25/12; F16H 25/2021; H02K 7/06
USPC ........... 74/89.23, 89.26, 89.29, 89.34, 424.92
See application file for complete search history.

(56) References Cited

U.S. PATENT DOCUMENTS

| | | | | |
|---|---|---|---|---|
| 2,860,266 | A | * 11/1958 | Schrader | ..................... 310/112 |
| 4,179,944 | A | 12/1979 | Conner | |
| 4,521,707 | A | * 6/1985 | Baker | ............................. 310/80 |
| 4,607,180 | A | 8/1986 | Stoody | |
| 4,779,822 | A | 10/1988 | Burandt et al. | |
| 6,791,215 | B2 | 9/2004 | Tesar | |
| 7,802,488 | B2 | 9/2010 | Bucheton et al. | |

(Continued)

FOREIGN PATENT DOCUMENTS

| | | |
|---|---|---|
| EP | 0325027 A1 | 7/1989 |
| EP | 0901960 A2 | 3/1999 |
| EP | 1865590 A1 * | 12/2007 |
| WO | 2007024220 A1 | 3/2007 |
| WO | 2008047066 A1 | 4/2008 |

OTHER PUBLICATIONS

Yongjun Bai, The design of a PKM-type composite actuator for servo mechanical presses, ASME/IFToMM International Conference on Reconfigurable Mechanisms and Robots pp. 243-250; Jun. 22-24, 2009.
Villani, Multi-phase fault tolerant drives for aircraft applications, Electrical Systems for Aircraft, Railway and Ship Propulsion (ESARS), pp. 1-6, Oct. 19-21, 2010.
Search Report which was issued in connection with Great Britain Application No. 1105478.0 which was filed on Mar. 2011.
Search Report from corresponding GB Application No. 1108483.7, dated Aug. 20, 2011.

*Primary Examiner* — Justin Krause
(74) *Attorney, Agent, or Firm* — Thomas H. Walls; Dann, Dorfman, Herrell and Skillman

(57) ABSTRACT

A linear actuator for an aircraft comprising a casing comprising a first casing section and a second casing section, wherein the first casing section and the second casing section are extendible and retractable with respect to each other, and a first drive mechanism and a second drive mechanism disposed in the casing, wherein the first drive mechanism and the second drive mechanism are operable independently of each other to drive at least one transmission element connected to an interior of the casing.

5 Claims, 1 Drawing Sheet

(56) References Cited

U.S. PATENT DOCUMENTS

| | | |
|---|---|---|
| 7,883,054 B2 * | 2/2011 | Elliott et al. ............ 244/99.9 |
| 2003/0148846 A1 | 8/2003 | Reimann |
| 2005/0269887 A1 * | 12/2005 | Blanding et al. ........... 310/112 |
| 2006/0266146 A1 | 11/2006 | Waide |
| 2009/0289145 A1 * | 11/2009 | Behar et al. ............ 244/99.4 |
| 2010/0038478 A1 | 2/2010 | Knight |
| 2012/0025002 A1 | 2/2012 | Zink |

* cited by examiner

HIGH INTEGRITY LINEAR ACTUATOR AND METHOD OF OPERATION

BACKGROUND OF THE INVENTION

1. Field of the Invention

Embodiments of the present invention relate to linear actuators and methods of operation of linear actuators and, more particularly, to linear actuators and methods of operation of linear actuators for use in aircraft.

2. Description of the Prior Art

Actuation of safety critical mechanisms in safety critical systems or equipment needs to achieve a high level of reliability. It is generally known to use hydraulic actuators in aircraft, for example, to operate landing gears and/or flaps and ailerons and so on, due to their reliability. Hydraulic system failure is usually caused by leakage of hydraulic fluid, and the system fails to a freely moveable state without jamming. In the case of hydraulically actuated landing gears, this allows the gears to be lowered for landing in spite of a system failure.

The utilization of electromechanical actuators is advantageous because they are light in weight and can be incorporated into an aircraft simply and powered using the electric power distribution system within the aircraft. However, electric motors have a significant seizure failure mode, whereby they tend to fail to a jammed state, which prevents backup systems from becoming effective.

Aircraft safety regulations require high integrity and invulnerability to single failures for those items of equipment whose failure could lead to catastrophic consequences. Landing gear actuators must meet this criterion and jam vulnerability has prevented electric actuation from being used.

Known failure-tolerant linear actuators require two separate actuators each having a disconnect device, wherein, in the event of a jam, the jammed actuator can be disengaged and the other actuator can be used.

BRIEF SUMMARY OF THE INVENTION

According to an embodiment of the present invention, there is provided a linear actuator for an aircraft. The actuator comprises a casing comprising a first casing section and a second casing section, wherein the first casing section and the second casing section are extendible and retractable with respect to each other, and a first drive mechanism and a second drive mechanism disposed in the casing, wherein the first drive mechanism and the second drive mechanism are operable independently of each other to drive at least one transmission element connected to an interior of the casing.

According to another embodiment of the present invention, there is provided a method of operating a linear actuator. The linear actuator comprises a casing comprising a first casing section and a second casing section, wherein the first casing section and the second casing section are extendible and retractable with respect to each other, and a first drive mechanism and a second drive mechanism disposed in the casing, wherein the first drive mechanism and the second drive mechanism are operable independently of each other to drive at least one transmission element connected to an interior of the first casing section or an interior of the second casing section. The method comprises using the first drive mechanism and second drive mechanism alternately with each use of the actuator.

BRIEF DESCRIPTION OF THE DRAWINGS

There follows a detailed description of embodiments of the present invention by way of example only, rather than limitations, and with reference to the accompanying schematic drawings, in which.

DETAILED DESCRIPTION OF THE INVENTION

Figure 1:
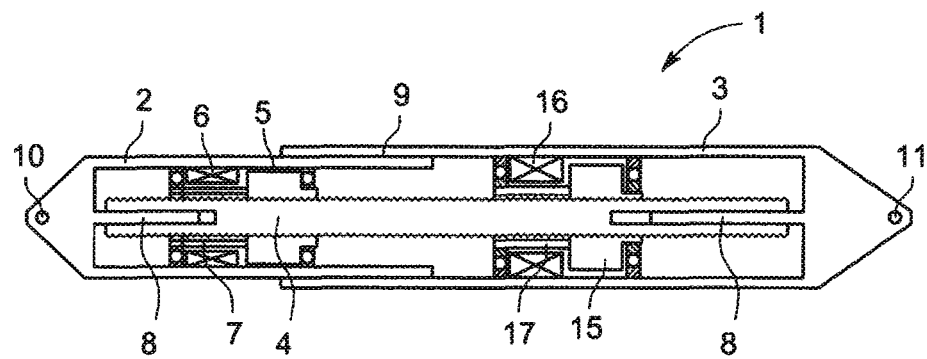
FIG. 1 is a cross-sectional view of an actuator according to an embodiment of the present invention.

FIG. 1 shows a linear actuator 1 comprising a casing including a first casing section 2 and a second casing section 3. The casing sections 2, 3 have a region 9 of overlap in which the sections 2, 3 are slidable relative to one another. In one embodiment, the casing sections 2, 3 are extendible and retractable with respect to one another. Inside the first casing section 2 there is provided a first drive mechanism comprising an electric motor including a stator 6 fast with the casing section 2 and a rotor 7 fast with a first roller screw 5. The first roller screw 5 is journalled in the casing section 2. In operation, the electric motor rotates the first roller screw 5, causing a transmission element 4 comprising a screw-threaded rod to move linearly. The motion of the transmission element 4 causes the casing sections 2, 3 to slide relative to one another. Each end of the casing sections 2, 3 has a spline or key 8 upon which the transmission element 4 is splined or keyed to allow relative movement between the casing sections 2, 3 even in the event of a jam in the drive mechanism. In the second casing section 3, a second drive mechanism is provided. The second drive mechanism comprises an electric motor including a stator 16 and a rotor 17 which drives a second roller screw 15 to move the screw-threaded rod of the transmission element 4. In the event of one of the first and second drive mechanisms failing or jamming, the other drive mechanism can drive the actuator 1. Thus, the drive mechanisms are operable independently of one another to drive one or more transmission elements 4 connected to the interior of the casing sections 2, 3. As such, the actuator 1 is immune to single failures. The actuator 1 is symmetrical which helps to prevent twisting loads on the end mountings.

A first end 10 of the actuator 1 can be attached to an aircraft structure, such as part of the frame, while a second end 11 of the actuator 1 can be connected to an object that is being actuated, for example, a landing gear.

In one embodiment, the drive mechanisms can be concentric with at least one transmission element 4. Where a large actuation force is needed, a reduction gearing can be interposed between the drive mechanism and the at least one transmission element 4.

Figure 2:
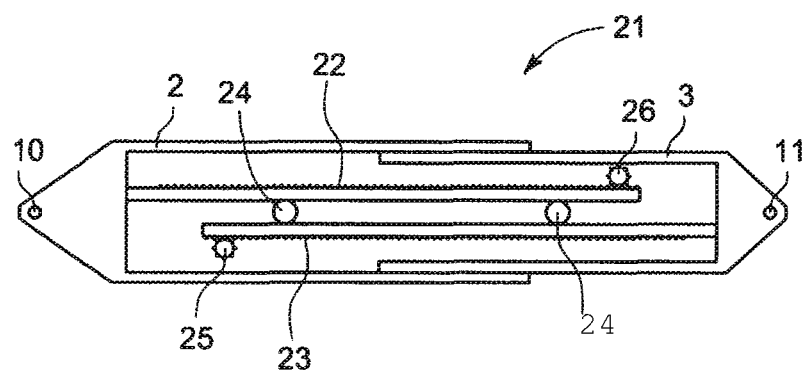
FIG. 2 is a cross-sectional view of an actuator according to an embodiment of the present invention.
Figure 3:
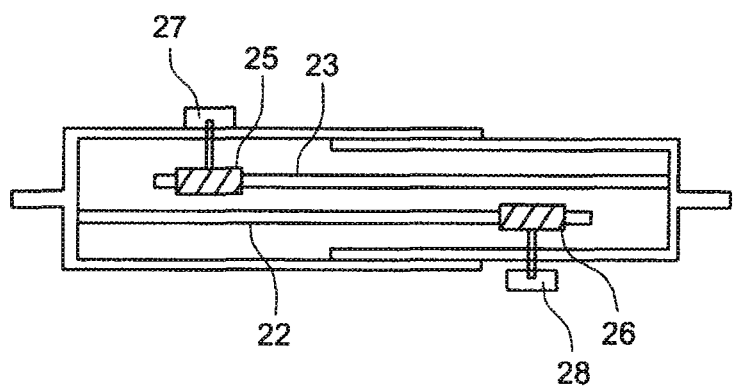
FIG. 3 is a cross-sectional view of an actuator according to an embodiment of the present invention.

FIG. 2 shows an embodiment of the present invention wherein like parts are designated by the same reference numerals as in FIG. 1. The actuator 21 comprises a first casing section 2 and a second casing section 3 which are slidably connected to one another. The transmission elements comprise racks 22, 23 which are driven by pinions 25, 26. The pinions 25, 26 are connected to respective electric motors 27, 28 which are shown in FIG. 3 on the outside of the casing sections 2, 3. However, in accordance with the present invention, the electric motors 27, 28 can also be provided inside the casing sections 2, 3. Idler gears 24 are disposed adjacent to each rack 22, 23 to support the racks 22, 23 and ensure good driving engagement between the racks 22, 23 and pinions 25, 26. In the event of a jam affecting one of the racks 22, 23 or pinions 25, 26 and/or one of the electric motors 27, 28, the actuator 21 can still function by virtue of the others.

Other types of connection between the electric motors 27, 28 and the transmission elements can be used in embodiments of the present invention without departing from the scope of the claims. For example, roller screws, ball screws, lead screws and rack and pinion arrangements are all usable. Independence of actuation could also be achieved using other forms of electro-magnetic actuation or hydraulics.

In one embodiment, the casing sections 2, 3 have a substantially constant cross-section, wherein the actuator 1, 21 has no projecting parts vulnerable to damage.

In normal operation, the first and second drive mechanisms are used alternately, so that the functionality of each drive mechanism is demonstrated with each alternate use. In one embodiment, both the first and second drive mechanisms can operate at the same time, as a result, the speed of actuation provided by each drive mechanism is added together, therefore the actuator 1, 21 can be operated at double speed if desired.

According to embodiments of the present invention, apart from control and power inputs (not shown) of the actuator 1, 21, the actuator 1, 21 is self-contained, wherein all of its components are housed within the casing sections 2, 3. Therefore, the actuator 1, 21 can be particularly well sealed against environmental ingress, which in turn improves the lifetime of the actuator 1, 21 and its internal components. The actuator 1, 21 also has fewer number of parts, thus providing a simple, reliable and low weight structure.

An actuator 1, 21 according to embodiments of present invention is continuously operable in the event of a failure of either one of the drive mechanisms or jamming of the gear assembly. Furthermore, the gear assembly avoids the use of disconnect clutches, whereby the actuator 1, 21 has a low weight, size and increased reliability.

What is claimed is:

1. A linear actuator for an aircraft comprising:
    a casing comprising:
        a first casing section and a second casing section, wherein the first casing section and the second casing section are extendible and retractable with respect to each other; and
        a first drive mechanism and a second drive mechanism disposed in the casing, wherein the first drive mechanism and the second drive mechanism are operable independently of each other to drive at least one transmission element connected to an interior of the casing;
    wherein the at least one transmission element comprises a screw-threaded rod that is splined to the interior of the first casing section and the interior of the second casing section.

2. The linear actuator according to claim 1, wherein the first drive mechanism and the second drive mechanism comprise electric motors.

3. The linear actuator according to claim 1, wherein the first casing section and the second casing section have a substantially constant cross-section.

4. The linear actuator according to claim 1, wherein at least one of the first drive mechanism and the second drive mechanism drives the screw-threaded rod through a roller screw.

5. The linear actuator according to claim 1, wherein at least one of the first drive mechanism and the second drive mechanism are concentric with the at least one transmission element.

\* \* \* \* \*